Jan. 16, 1940.  O'DELL K. HARVEY  2,187,027
GLARE SHIELD
Filed Oct. 23, 1937
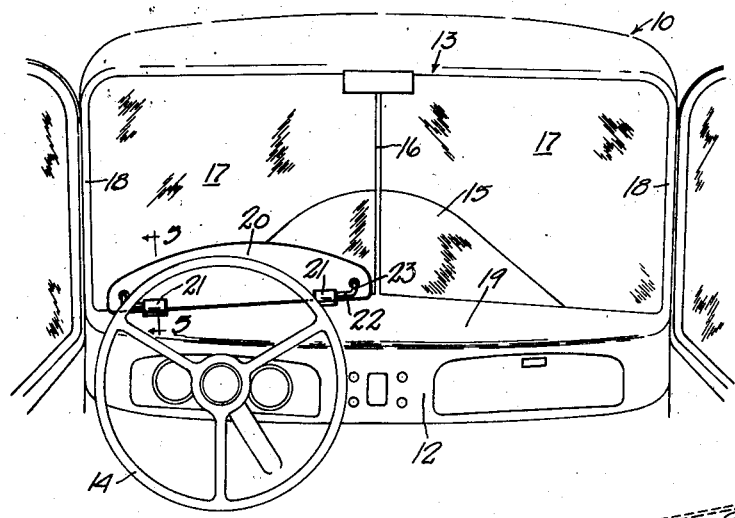
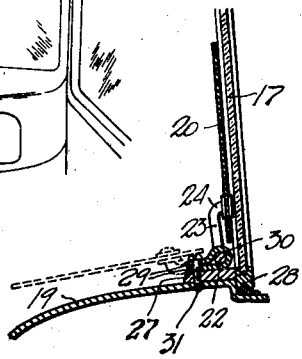
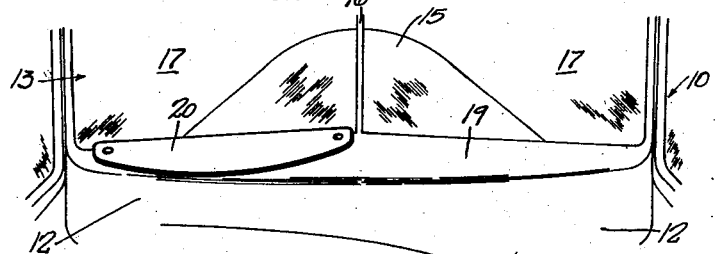
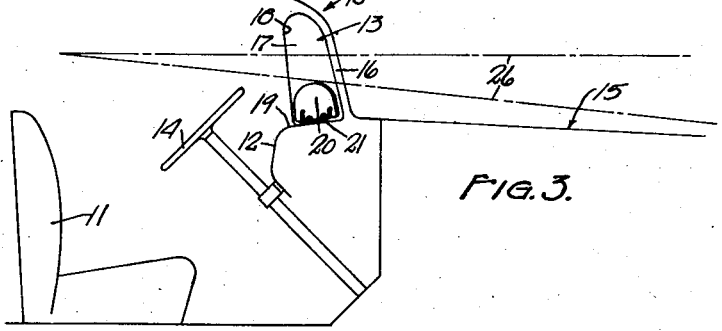
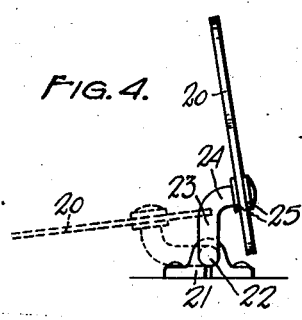
INVENTOR.
O'DELL K. HARVEY.
BY
ATTORNEYS.

Patented Jan. 16, 1940

2,187,027

UNITED STATES PATENT OFFICE 2,187,027

GLARE SHIELD

O'Dell K. Harvey, Marcellus, Mich.

Application October 23, 1937, Serial No. 170,568

4 Claims. (Cl. 296—97)

This invention relates to glare shields, and particularly to a glare shield for use on automobiles.

Glare from the brilliant headlights of oncoming automobiles, from light reflection from wet pavements, ice or snow, from light reflected by various parts of the driver's own automobile, as by the hood, and from other sources frequently cause great discomfort to the driver and impair his vision. In consequence, many automobile accidents can be attributed to glare. The danger from this cause is well and generally recognized and understood, and various arrangements and devices have been provided with the view of reducing and eliminating the possibility of glare. Recent automobile design has provided rearwardly upwardly inclined windshields, and the divided inclined windshield wherein the parts are set at an angle to the transverse with respect to the car body, all for the purpose of diverting light rays striking the windshield so that they will travel at an angle to the normal line of vision of the driver as they pass through and from the windshield. These arrangements constitute an advance in the solution of the problem, but are not a complete solution. Also various devices involving the use of light filtering material as a shield fixedly mounted on a windshield have been employed. These serve to prevent the glare but are subject to the objection that the driver's vision is impaired by the fixed shield for ordinary night driving and for daytime driving on sunless or cloudy days.

The trend of modern automobile design with the provision of the divided inclined windshield above described has resulted in an interior construction wherein a ledge or shelf extends between the bottom of the windshield and the top of the instrument panel, together with a substantial spacing of the steering wheel from the windshield. It is the primary object of my invention to utilize this shelf to pivotally mount a shield for eliminating glare from the automobile hood, wet or icy roads, snow, and the like; said shield being adapted to be pivoted between juxtaposed relation to the windshield and inoperative substantially horizontal position on the ledge forwardly of the steering wheel.

A further object is to provide a glare shield juxtaposed to the lower part of the windsield and terminating below the normal range of driving vision of the operator to eliminate fugitive and reflected rays of light and to eliminate glare of oncoming headlights when vehicles approach at a predetermined distance, but without impairing the vision of the operator in the normal range of driving vision.

Other objects will be apparent from the description, drawing and appended claims.

In the drawing:

Fig. 1 is a fragmentary perspective view of the interior of an automobile with my glare shield in operative position.

Fig. 2 is a fragmentary perspective view illustrating the glare shield in lowered inoperative position.

Fig. 3 is a fragmentary diagrammatic view illustrating the relation of the glare shield to the driver's normal line of vision.

Fig. 4 is an end view illustrating one embodiment of my invention.

Fig. 5 is a fragmentary vertical sectional view taken on line 5—5 of Fig. 1 and illustrating another embodiment of my invention.

Referring to the drawing, the numeral 10 designates the body of an automobile having seat 11, instrument panel 12, windshield 13, steering wheel 14 and hood 15. The windshield 13 is of the divided type wherein a mullion 16 forms a division between the windshield panes 17, and is positioned centrally thereof in upwardly rearwardly inclined position and forwardly of the outer ends 18 of the windshield frame whereby the panes 17 are positioned in complementary relation but are relatively angularly disposed. As an incident to this windshield construction and arrangement, a substantially horizontal ledge or shelf 19 is formed in the interior of the car body between the windshield and the upper end of instrument panel 12 with which said shelf is integral. This shelf spaces the lower end of the windshield a substantial distance forwardly of the steering wheel.

A glare shield 20 is pivotally mounted on the body to be normally juxtaposed to the windshield pane 17, in front of the steering wheel. One construction of the mounting for shield 20 is illustrated in Fig. 4 and comprises a pair of spring brackets 21 which are secured to ledge 19 adjacent the windshield, and arms 22 spring gripped by said brackets and mounting said shield 20. Arms 22 preferably comprise a substantially horizontal end portion engaged by bracket 21 and intermediate angularly bent portion 23, and a shield engaging end portion 24. A pair of washers 25 are mounted on end portion 24 on opposite sides of shield 20 to protect the same. The shield 20 may comprise a sheet of transparent material, such as colored Celluloid or the like which serves to filter and reduce glare, or may be a sheet of material which is entirely opaque; but is preferably substantially rigid. Shield 20 is preferably long and narrow whereby its length is substantially equal to the width of a windshield pane 17 and its width or height is comparatively small so that it terminates just below the normal range of driving vision as illustrated by lines 26 in Fig. 3, when in upright vertical position. The shield may be swung to inoperative substantially horizontal position upon ledge 19 as illustrated in Fig. 2; the brackets 21 having a clamping action upon the rods 22 to normally hold the same against movement but not sufficient to prevent tilting thereof manually to any desired position.

It will thus be seen that, when shield 20 is in operative position, the driver is shielded from all rays and reflections originating below the normal level of driving vision. Thus sun glare or light glare reflecting from the automobile hood, radiator frame, cap or emblem, is intercepted by the shield. Likewise, light or glare reflected from the ground adjacent the auto, as by wet pavements, ice or snow, is similarly intercepted by the shield. During night driving, the glare of headlights is also partially intercepted by the shield, at least to the extent that reflections from downwardly directed rays thereof are intercepted. It will also be seen that, in night driving, the glare of headlights of oncoming cars will be fully intercepted when the approaching cars reach a certain maximum spacing thereby insuring elimination of glare before the cars come abreast and during the interval when glare is most intense and disturbing under ordinary conditions. This clears the driver's vision while approaching cars are still far enough apart to permit correction of any glare-induced steering mistakes before the cars meet and pass.

The adjustment of the device, as afforded by the pivot mounting of rods 22 by brackets 21, permits control of vision by the driver. Thus, when driving under conditions where glare is not likely but full vision and particularly vision close to the auto is necessary, as on dark, rainy or snowy days or where road conditions are bad and can be detected only as the auto closely approaches them, the shield can be lowered to position which permits full, clear and unobstructed vision through the entire area of the windshield. The ledge or shelf 19 against which the shield 20 is so lowered, may serve as a support therefor, and additionally of a greater importance, permits, by its width, positioning of at least the major portion of the shield forwardly of the instrument panel and forwardly spaced from the steering wheel. Such positioning of the shield prevents obstruction to the driver's vision of the instrument panel and also prevent interference with operation of the steering wheel.

The construction illustrated in Fig. 5 constitutes another embodiment of the mounting of the shield. This construction is adapted to automobiles having a strip or band 27 across the front of the ledge 19, as to form an abutment against which the lower portion 28 of the windshield frame may seat. Such strips commonly are held to place by spaced screws which can be removed and replaced by elongated screws 31 for securing the brackets which mount shield 20. As illustrated in Fig. 5, the brackets may comprise a pair of spaced arms 29 and an enlarged journal portion 30 integral therewith and the whole formed of resilient material so that, as the securing screws 31 are tightened, the bracket will be tightened upon the shield mounting rod 22 which is preferably of the same construction heretofore described. This embodiment thus has the advantages of ready application to present day automobiles and provision for simply and quickly tightening the clamping action of the bracket upon the shield-mounting rod.

I claim:

1. The combination with an automobile having a windshield, an instrument panel and an elongated rigid ledge therebetween, of a glare shield of a width substantially equal to the width of said ledge, and means for mounting said glare shield at the front of said ledge adjacent said windshield for pivotal movement on a substantially horizontal axis parallel to said windshield.

2. The combination with an automobile having a windshield and an inwardly extending ledge adjacent the bottom thereof, of a narrow elongated glare shield, and means mounted on the front of said ledge for pivotally mounting said glare shield parallel to said windshield.

3. The combination with an automobile having a windshield, an inwardly extending ledge adjacent the bottom of said windshield, and an instrument panel below the inner end of said ledge, of a rigid glare shield normally juxtaposed to the windshield at the front of said ledge, said glare shield being of a shape and width to intercept light reflected upwardly from objects on and adjacent the front of the automobile and to terminate below the normal range of driving vision when operatively positioned, said glare shield being shiftable to overlie said ledge without concealing said instrument panel.

4. The combination with an automobile having a windshield and an instrument panel rearwardly of and below said windshield, of a glare shield normally juxtaposed to the lower portion of said windshield and shiftable to substantially horizontal position above said panel, said glare shield lying between the operator's range of driving vision and of panel vision in all positions thereof and tapering from its center to its ends to afford effective shielding of front glare and of lateral glare.

O'DELL K. HARVEY.